(12) United States Patent
Aihara et al.

(10) Patent No.: US 10,765,158 B2
(45) Date of Patent: Sep. 8, 2020

(54) FOAM NODES FOR CREATING STAND OFF ON APPAREL ITEMS

(71) Applicant: NIKE, Inc., Beaverton, OR (US)

(72) Inventors: Yuki Aihara, Portland, OR (US); Alice Fockele, Portland, OR (US); David Turner, Portland, OR (US); Carmen L. Zolman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/286,177

(22) Filed: Feb. 26, 2019

(65) Prior Publication Data

US 2019/0191800 A1 Jun. 27, 2019

Related U.S. Application Data

(63) Continuation of application No. 15/263,899, filed on Sep. 13, 2016, now Pat. No. 10,264,834.

(Continued)

(51) Int. Cl.
*A41D 27/28* (2006.01)
*A41B 17/00* (2006.01)
(Continued)

(52) U.S. Cl.
CPC ............. *A41D 27/28* (2013.01); *A41B 1/08* (2013.01); *A41D 13/0158* (2013.01); *A41D 31/102* (2019.02); *A41D 31/12* (2019.02); *A41D 31/125* (2019.02); *A41D 31/14* (2019.02); *D06N 7/0092* (2013.01); *A41B 2400/20* (2013.01); *A41D 3/00* (2013.01); *A41D 2500/10* (2013.01);
(Continued)

(58) Field of Classification Search
None
See application file for complete search history.

(56) References Cited

U.S. PATENT DOCUMENTS 3,914,487 A 10/1975 Azoulay
4,206,514 A 6/1980 Yamauchi
(Continued)

FOREIGN PATENT DOCUMENTS

CN 202552217 U 11/2012
CN 203807860 U * 9/2014
(Continued)

OTHER PUBLICATIONS

Machine Translation of CN-203807860-U, Sep. 2014 (Year: 2014).*
Communication under Rule 71(3) dated Nov. 21, 2019 in European Patent Application No. 16770176.2, 44 pages.

*Primary Examiner* — Jeffrey A Vonch
(74) *Attorney, Agent, or Firm* — Shook, Hardy and Bacon LLP

(57) ABSTRACT

Aspects herein relate to apparel items and apparel systems that utilize applied or printed foam nodes to provide, among other things, stand-off between an apparel item and a wearer's skin surface. One or more of the foam nodes, or areas of the textile surrounding the foam nodes, may be perforated to provide a fluid communication path between an inner-facing surface and an outer-facing surface of the apparel item. The communication path may be used to facilitate air exchange between the external environment and the wearer's body and/or to provide an exit path for moisture vapor generated by the wearer.

17 Claims, 12 Drawing Sheets

Related U.S. Application Data

(60) Provisional application No. 62/313,316, filed on Mar. 25, 2016.

(51) Int. Cl.

| | | |
|---|---|---|
| *B32B 3/24* | (2006.01) | |
| *B05D 5/00* | (2006.01) | |
| *D06N 7/00* | (2006.01) | |
| *A41B 1/08* | (2006.01) | |
| *A41D 13/015* | (2006.01) | |
| *A41D 31/14* | (2019.01) | |
| *A41D 31/102* | (2019.01) | |
| *A41D 31/12* | (2019.01) | |
| *A41D 3/00* | (2006.01) | |
| *B05D 5/08* | (2006.01) | |
| *B32B 3/26* | (2006.01) | |
| *B32B 3/28* | (2006.01) | |
| *B32B 3/08* | (2006.01) | |
| *B32B 27/12* | (2006.01) | |
| *B32B 3/30* | (2006.01) | |
| *B32B 5/32* | (2006.01) | |
| *B32B 27/06* | (2006.01) | |

(52) U.S. Cl.
CPC ...... *A41D 2500/20* (2013.01); *A41D 2600/10* (2013.01); *B05D 5/08* (2013.01); *B05D 5/086* (2013.01); *B32B 3/085* (2013.01); *B32B 3/266* (2013.01); *B32B 3/28* (2013.01); *B32B 3/30* (2013.01); *B32B 5/32* (2013.01); *B32B 27/06* (2013.01); *B32B 27/12* (2013.01); *B32B 2255/02* (2013.01); *B32B 2255/26* (2013.01); *B32B 2255/28* (2013.01); *B32B 2305/022* (2013.01); *B32B 2307/724* (2013.01); *B32B 2307/746* (2013.01); *B32B 2307/75* (2013.01); *B32B 2437/00* (2013.01); *D06N 2203/00* (2013.01); *D06N 2205/04* (2013.01); *D06N 2209/108* (2013.01); *D06N 2209/123* (2013.01); *D06N 2209/1657* (2013.01); *D06N 2211/10* (2013.01); *D06N 2213/03* (2013.01); *D06N 2213/04* (2013.01); *Y10T 428/2481* (2015.01); *Y10T 428/24273* (2015.01); *Y10T 428/24322* (2015.01); *Y10T 428/24496* (2015.01); *Y10T 428/24628* (2015.01); *Y10T 428/24802* (2015.01); *Y10T 428/249953* (2015.04); *Y10T 442/273* (2015.04)

(56) References Cited

U.S. PATENT DOCUMENTS

| | | | |
|---|---|---|---|
| 4,655,868 A | | 4/1987 | Hefele |
| 5,133,088 A * | | 7/1992 | Dunlap .................. A41B 11/02 2/239 |
| 5,168,576 A | | 12/1992 | Krent et al. |
| 5,575,012 A | | 11/1996 | Fox et al. |
| 5,590,420 A | | 1/1997 | Gunn |
| 5,918,317 A | | 7/1999 | Bernhardt |
| 6,332,221 B1 | | 12/2001 | Gracey |
| 6,520,926 B2 | | 2/2003 | Hall |
| 6,770,579 B1 | | 8/2004 | Dawson et al. |
| 7,891,026 B1 | | 2/2011 | Smith |
| 2002/0072289 A1 | | 6/2002 | Jasani et al. |
| 2002/0197924 A1 | | 12/2002 | Halley et al. |
| 2003/0017772 A1 | | 1/2003 | Sloot |
| 2003/0054141 A1 | | 3/2003 | Worley et al. |
| 2003/0143381 A1 | | 7/2003 | Hurten et al. |
| 2004/0033743 A1 | | 2/2004 | Worley et al. |
| 2004/0111782 A1 | | 6/2004 | Lenormand et al. |
| 2004/0132367 A1 | | 7/2004 | Rock |
| 2004/0267226 A1 | | 12/2004 | Dabi et al. |
| 2005/0053759 A1 | | 3/2005 | Rock et al. |
| 2005/0086721 A1 | | 4/2005 | Lambertz |
| 2005/0095940 A1 | | 5/2005 | Rock et al. |
| 2005/0176324 A1 | | 8/2005 | Michel |
| 2005/0191920 A1 | | 9/2005 | Sadato |
| 2005/0204449 A1 * | | 9/2005 | Baron ...................... D04B 1/16 2/69 |
| 2006/0026743 A1 | | 2/2006 | Farnworth et al. |
| 2006/0080754 A1 * | | 4/2006 | Baron .................. A41D 13/002 2/85 |
| 2006/0080755 A1 | | 4/2006 | Baron et al. |
| 2006/0156451 A1 * | | 7/2006 | Klein ................... A41D 19/001 2/159 |
| 2006/0199456 A1 | | 9/2006 | Taylor |
| 2007/0028365 A1 | | 2/2007 | Williams |
| 2007/0033696 A1 | | 2/2007 | Sellier |
| 2007/0074328 A1 | | 4/2007 | Melhart et al. |
| 2007/0094762 A1 | | 5/2007 | Carter et al. |
| 2007/0220673 A1 | | 9/2007 | Nichols |
| 2008/0075850 A1 | | 3/2008 | Rock |
| 2008/0113143 A1 | | 5/2008 | Taylor |
| 2008/0188152 A1 | | 8/2008 | Tsai et al. |
| 2008/0233368 A1 | | 9/2008 | Hartmann et al. |
| 2008/0289078 A1 * | | 11/2008 | Mather .............. A41D 13/0015 2/85 |
| 2009/0126057 A1 | | 5/2009 | Rock et al. |
| 2009/0235429 A1 | | 9/2009 | Pickard et al. |
| 2009/0255038 A1 | | 10/2009 | Curtis |
| 2009/0276936 A1 | | 11/2009 | Makida et al. |
| 2009/0297794 A1 | | 12/2009 | Lin |
| 2009/0320174 A1 | | 12/2009 | Turner |
| 2010/0031706 A1 | | 2/2010 | Chaveau et al. |
| 2010/0186435 A1 | | 7/2010 | Vogel et al. |
| 2010/0221972 A1 | | 9/2010 | Soane |
| 2010/0282433 A1 | | 11/2010 | Blackford |
| 2010/0293703 A1 | | 11/2010 | Tezartes-Strauss et al. |
| 2011/0083246 A1 | | 4/2011 | Vitarana |
| 2011/0088137 A1 | | 4/2011 | Ayers et al. |
| 2011/0104448 A1 | | 5/2011 | Chung et al. |
| 2011/0265242 A1 | | 11/2011 | Lambertz |
| 2012/0015155 A1 | | 1/2012 | Blackford et al. |
| 2012/0052266 A1 | | 3/2012 | Tee |
| 2012/0058315 A1 | | 3/2012 | Antheme et al. |
| 2012/0058316 A1 | | 3/2012 | Cherneski |
| 2012/0131720 A1 | | 5/2012 | Nordstrom et al. |
| 2012/0174282 A1 | | 7/2012 | Newton et al. |
| 2012/0210487 A1 | | 8/2012 | Albin et al. |
| 2012/0244312 A1 | | 9/2012 | Pearce et al. |
| 2013/0004747 A1 | | 1/2013 | Schwarz et al. |
| 2013/0078415 A1 | | 3/2013 | Rock |
| 2013/0263360 A1 | | 10/2013 | Thibodeau |
| 2013/0263859 A1 | | 10/2013 | Ho et al. |
| 2013/0273300 A1 * | | 10/2013 | Baychar .............. D04H 1/4391 428/90 |
| 2013/0298589 A1 | | 11/2013 | Holdsworth-Layton |
| 2014/0026285 A1 * | | 1/2014 | Baldino .................. A41D 31/02 2/69 |
| 2014/0053311 A1 | | 2/2014 | Nordstrom et al. |
| 2014/0069624 A1 | | 3/2014 | Blackwell et al. |
| 2014/0087615 A1 | | 3/2014 | Edberg et al. |
| 2014/0230124 A1 | | 8/2014 | Wilms-Otto |
| 2014/0255664 A1 | | 9/2014 | Gartmann et al. |
| 2014/0259333 A1 | | 9/2014 | Marquez et al. |
| 2014/0310847 A1 | | 10/2014 | Ulriksen et al. |
| 2015/0135396 A1 | | 5/2015 | White et al. |
| 2015/0210032 A1 | | 7/2015 | Blackford et al. |
| 2015/0366735 A1 | | 12/2015 | Barker |
| 2016/0227857 A1 | | 8/2016 | Huff |
| 2016/0327113 A1 | | 11/2016 | Shelley |
| 2017/0071275 A1 * | | 3/2017 | Darby .................... A41D 31/14 |
| 2017/0120082 A1 | | 5/2017 | Barbeau et al. |
| 2018/0035727 A1 | | 2/2018 | Cumiskey et al. |

FOREIGN PATENT DOCUMENTS

| | | |
|---|---|---|
| CN | 203807860 U | 9/2014 |
| CN | 204653823 U | 9/2015 |
| DE | 10047549 C1 | 1/2002 |

(56) References Cited

FOREIGN PATENT DOCUMENTS

| | | | |
|---|---|---|---|
| DE | 202007004756 | U1 | 5/2007 |
| EP | 1473059 | A2 | 11/2004 |
| EP | 2484234 | A2 | 8/2012 |
| EP | 2702884 | A1 | 3/2014 |
| GB | 1094893 | A | 12/1967 |
| JP | 03227230 | A | 10/1991 |
| JP | 09225045 | A | 9/1997 |
| JP | 3078366 | U | 7/2001 |
| JP | 2002180302 | A | 6/2002 |
| JP | 2003105608 | A | 4/2003 |
| JP | 3138350 | U | 12/2007 |
| JP | 2010043388 | A | 2/2010 |
| JP | 2010065332 | A | 3/2010 |
| KR | 100237062 | B1 | 10/1999 |
| NL | 1040558 | C | 6/2015 |
| WO | 9935926 | A1 | 7/1999 |
| WO | WO-9935926 | A1 * | 7/1999 ........... A41D 31/085 |

* cited by examiner

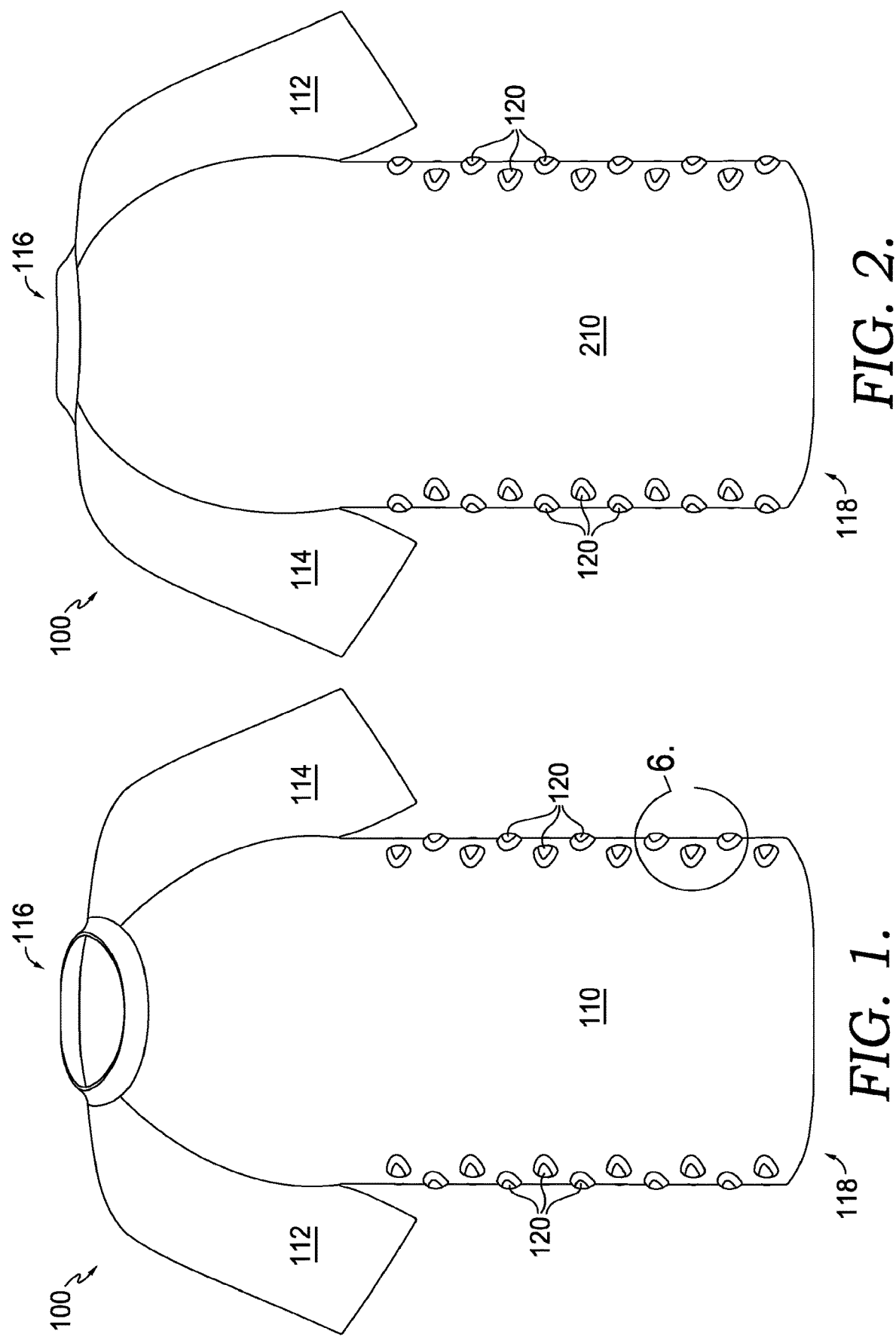

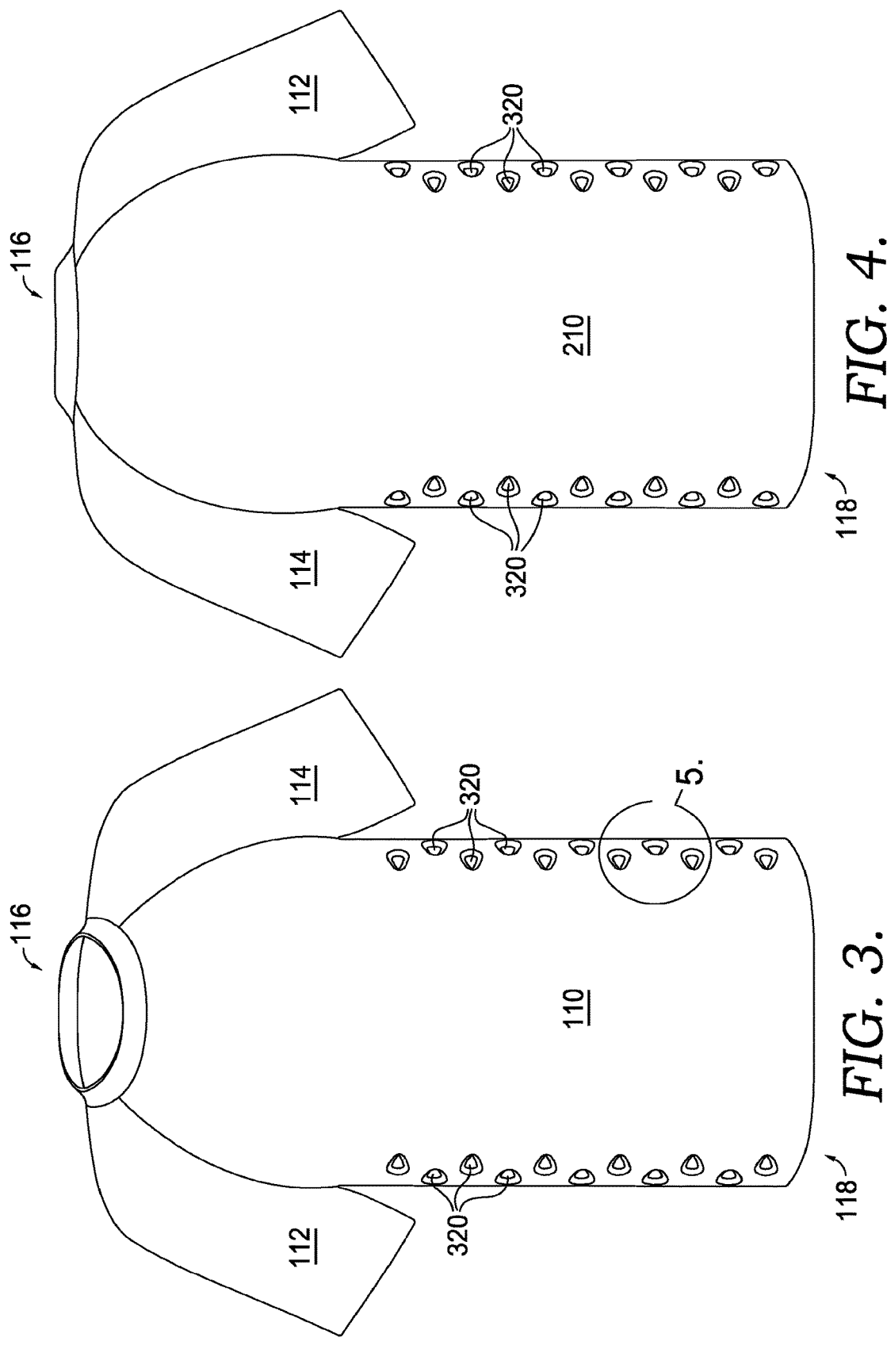

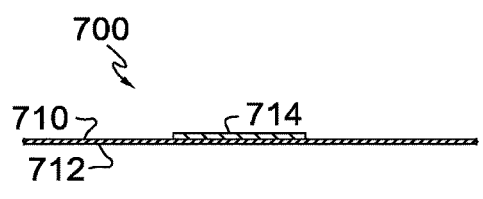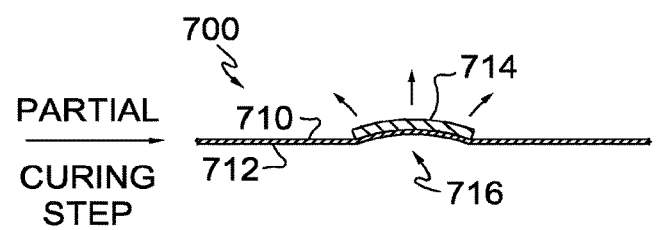
FIG. 7A.  FIG. 7B.
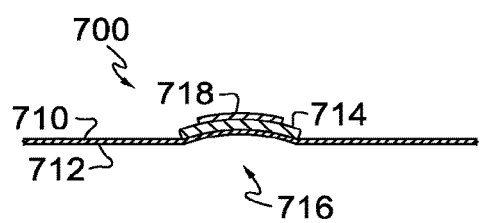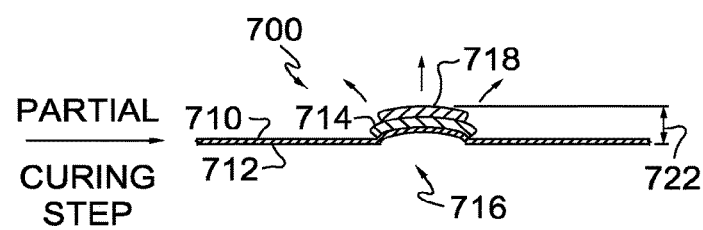
FIG. 7C.  FIG. 7D.

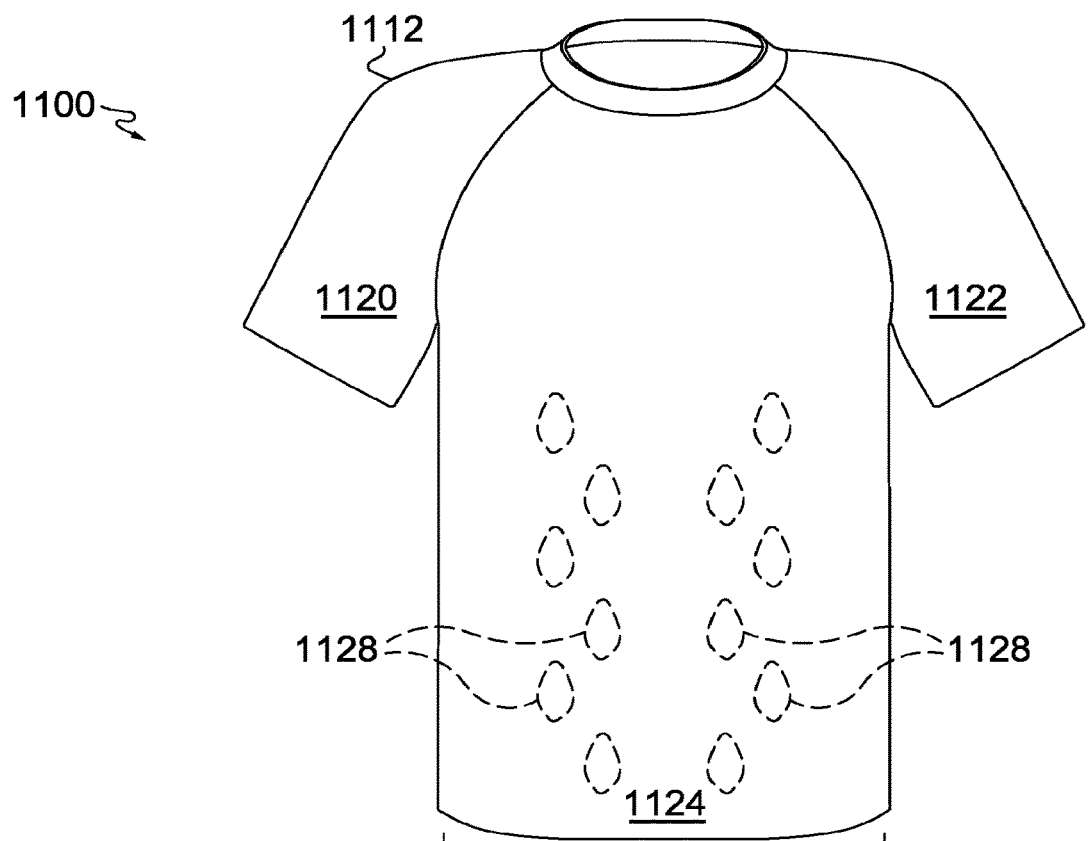
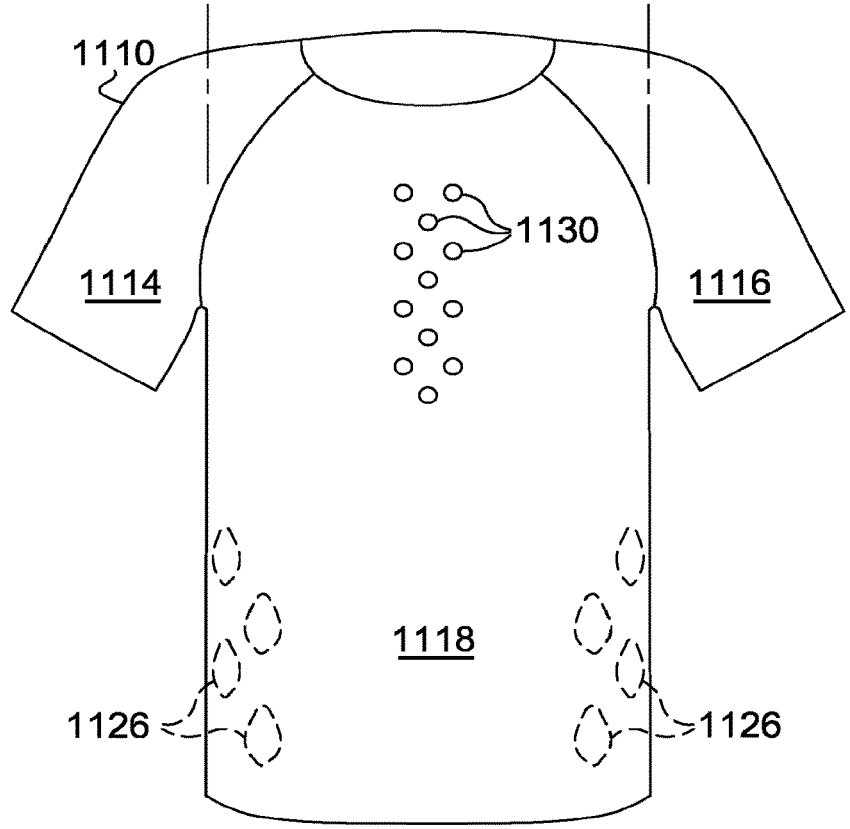
FIG. 11.

FOAM NODES FOR CREATING STAND OFF ON APPAREL ITEMS

CROSS-REFERENCE TO RELATED APPLICATIONS

This application, entitled "Foam Nodes for Creating Stand Off on Apparel Items," is a continuation application of U.S. application Ser. No. 15/263,899, filed Sep. 13, 2016, and entitled "Foam Nodes for Creating Stand Off on Apparel Items." The '899 application claims priority to U.S. Prov. App. No. 62/313,316, entitled "Foam Nodes for Creating Stand Off on Apparel Items," and filed Mar. 25, 2016. The entireties of the aforementioned applications are incorporated by reference herein.

TECHNICAL FIELD

Aspects herein relate to creating stand-off on apparel items using foam nodes.

BACKGROUND

Creating a space between an inner-facing surface of an apparel item and a wearer's body surface may be important to promote evaporative cooling and/or to reduce the perception of cling. Traditional athletic apparel often lacks any type of stand-off. When stand-off is present, current methods of creating stand-off may be labor intensive and expensive.

BRIEF DESCRIPTION OF THE DRAWINGS

Examples of the present invention are described in detail below with reference to the attached drawing figures, wherein:

FIG. 1 illustrates a front view of an inner-facing surface of an exemplary apparel item with foam nodes in accordance with aspects herein;

FIG. 2 illustrates a back view of the inner-facing surface of the exemplary apparel item of FIG. 1 in accordance with aspects herein;

FIG. 3 illustrates a front view of an outer-facing surface of the exemplary apparel item of FIG. 1 in accordance with aspects herein;

FIG. 4 illustrates a back view of the outer-facing surface of the exemplary apparel item of FIG. 3 in accordance with aspects herein;

FIG. 7A-7D illustrate cross-sectional views of an exemplary foam node undergoing a curing process in accordance with aspects herein;

FIG. 11 illustrates an exploded view of an exemplary apparel system that utilizes foam nodes in accordance with aspects herein;

DETAILED DESCRIPTION

Figure 5:
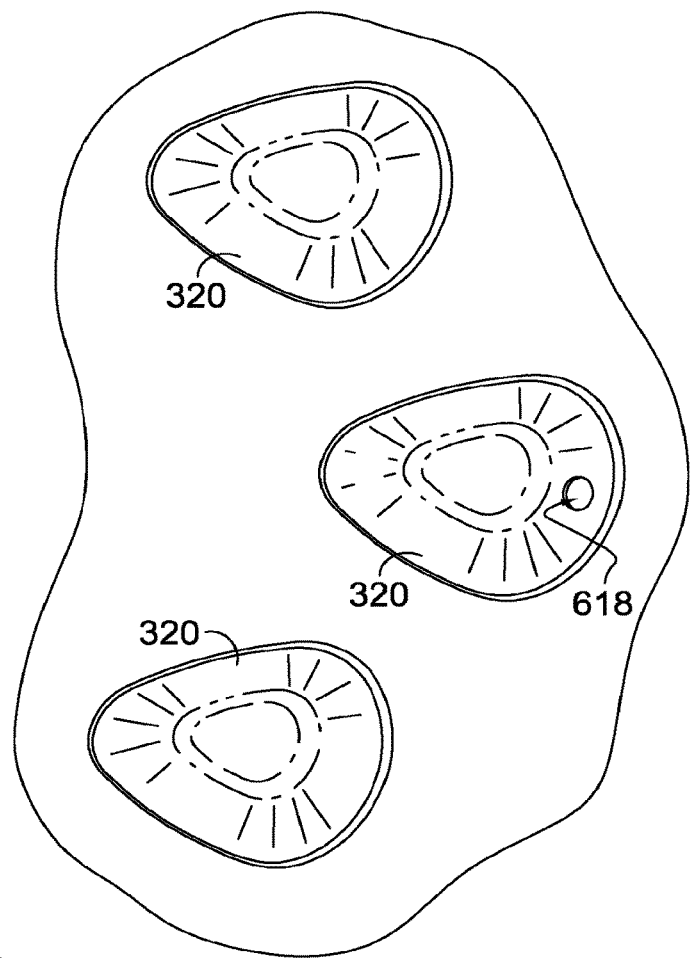
FIG. 5 illustrates a close-up view of the outer-facing surface of the exemplary apparel item of FIG. 3 in accordance with aspects herein.

The subject matter of the present invention is described with specificity herein to meet statutory requirements. However, the description itself is not intended to limit the scope of this disclosure. Rather, the inventors have contemplated that the disclosed or claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Aspects herein relate to apparel items and apparel systems that utilize applied or printed foam nodes (hereinafter known as "foam nodes" or "foam ink nodes") to provide stand-off as well as other functional benefits. In exemplary aspects, the foam ink nodes may be used to create stand-off between an apparel item and a wearer's skin surface. This may be useful for reducing the perception of cling and for creating a space in which air can circulate to help cool the wearer by enhancing at least evaporative heat transfer. In exemplary aspects, one or more of the foam nodes, or areas of the textile surrounding the foam nodes, may be perforated to provide a fluid communication path between an inner-facing surface and an outer-facing surface of the apparel item. The communication path may be used to facilitate air exchange between the external environment and the wearer's body and/or to provide an exit path for moisture vapor generated by the wearer.

The foam nodes described herein may also be used to create stand-off between, for instance, a first layer apparel item and a second layer apparel item configured to be worn over the first layer. Creating stand-off between these layers may provide an insulative effect as warmed air circulates in the space between the two layers.

Moreover, the creation of foam nodes on a first surface of the apparel item may create a deboss pattern and an optional emboss pattern on a second opposite surface of the apparel item. The deboss pattern (and the emboss pattern when present) may help to further increase the amount of stand-off associated with a particular node. As well, the deboss patterns may be used to create channels or paths to, for instance, guide water or air traveling over the apparel item.

As used throughout this disclosure, directional terms such as anterior, posterior, superior, inferior, lateral, medial, upper, lower, front, back, and the like are to be given their common anatomical meaning and are used with respect to the apparel item being in an as-worn configuration by a wearer standing in anatomical position. Moreover, unless indicated otherwise, terms such as coupling, affixing, securing, and the like may comprise releasably securing items together or permanently securing items together using affixing technologies known in the art such as stitching, bonding, adhesives, welding, buttons, snaps, zippers, hook-and-loop fasteners, and the like.

Continuing, as used throughout this disclosure, the term "foam node" or "foam ink node" may be defined as a node formed by incorporating a foaming additive into one or more ink formulations (water-based, silicone-based, polyurethane-based, rubber-based, acrylic-based, plastisol inks, and the like). Exemplary ratios of the foaming additive (which may be pre-mixed) to the ink formulation may comprise 80:20, 70:30, 60:40, and/or 50:50 although ratios other than those listed are contemplated herein. The percentage of foaming additive, and/or the type of foaming additive, may help to determine the amount of stand-off associated with a particular foam node. As well, the percentage of foaming additive, and/or the type of foaming additive, may be selected to achieve varying levels or degrees of emboss or deboss on the opposite surface of the foam node.

The foaming additive/ink formulation may be applied or adhered to an apparel item utilizing, for instance, screen printing (using, for instance, a regular screen or a high-density screen), two-dimensional (2-D) printing, 3-D printing, manual application, and the like. Upon exposure to an activator such as heat, light, radio-frequency waves, ultrasound, water, chemicals, and the like, the foaming additive expands to form cells or microspheres within the base ink. The result is that the ink formulation "rises" or extends away from the surface plane of the apparel item in all directions (e.g., in an x-direction, a y-direction, and a z-direction) by a predetermined amount which may be dependent upon the particular foaming additive/ink formulation used and/or may be dependent upon the variables associated with the activation process such as time, temperature, intensity, and the like.

Further, it is contemplated herein that the term "foam node" or "foam ink node" may encompass a single layer of the foaming additive/ink formulation or multiple layers of the foaming additive/ink formulation (2 layers, 3 layers, up to, for instance, 6 layers). With this aspect, each layer may be partially activated or cured (the terms "activated" and "cured" may be used interchangeably herein) before the addition of the new layer. In exemplary aspects, the partial activation may help to at least partially set the ink (e.g., causing the ink to assume a gel-like consistency) and to initiate the expansion of the foaming additive. Partially setting the ink, in turn, may help to prevent the ink from spreading on the base textile when a subsequent ink layer is applied. One exemplary process for partially setting the ink may comprise flash curing the ink layers by exposing the applied foaming additive/ink formulation to temperatures within a predetermined range for a predetermined amount of time. Once all the layers have been applied, the foam node may undergo a final activation or curing step that fully sets the ink and completes the activation of the foaming additive. In exemplary aspects, the final curing step may comprise exposing the applied layers to a temperature that is higher than the temperature used to partially cure the foaming additive/ink formulation.

When the foam node comprises multiple layers, it is contemplated herein that each layer may comprise the same foaming additive/ink formulation, or different foaming additive/ink formulations may be used for one or more of the layers. It is further contemplated herein, that one or more of the layers may not comprise a foaming additive. For instance, a base or primer layer may be used to help seal the base textile and to help control the direction the foam node expands, where the base layer may not comprise a foaming additive. In another example, a top layer may be used to help seal the node and/or provide a soft feel since this layer may come into contact with a wearer's skin surface, where the top layer may not comprise a foaming additive. The top layer may also be configured to provide a cooling feature to the wearer when the layer comes into contact with the wearer's skin. For example, the top layer may be impregnated with a cooling agent such as a menthol, peppermint, spearmint oil, and the like that may provide the perception of cooling when it comes into contact with a wearer's skin. Moreover, it is contemplated herein that each layer may have the same thickness, or one or more of the layers may have a different thickness. Any and all aspects, and any variation thereof, are contemplated as being within the scope herein.

Accordingly, in a first aspect, an apparel item is provided that comprises at least one panel of material having an inner-facing surface and an outer-facing surface. The apparel item further comprises one or more foam ink nodes located on the inner-facing surface of the panel of material.

In another aspect, a method of manufacturing an apparel item having one or more foam ink nodes is provided. The method may comprise providing at least a first panel of material having a first surface and a second opposite surface, applying at least a first layer of ink having a foaming additive in a first predetermined pattern to at least a portion of the first surface, activating or curing the ink, and forming the apparel item from at least the first panel such that the first surface of the first panel forms an inner-facing surface of the apparel item.

In yet another aspect, a layered apparel system is provided. The layered apparel system comprises an inner article having a first plurality of foam ink nodes located on at least one of an inner-facing surface or an outer-facing surface of the inner apparel item, and an outer article configured to be layered over the inner article. The outer article comprises a second plurality of foam ink nodes located on an inner-facing surface of the outer article.

A further aspect provides for an apparel item comprising at least one panel of material comprising an inner-facing surface and an outer-facing surface, and at least one foam node applied to the inner-facing surface of the panel of material, where the foam node extends convexly away from the surface plane of the panel of material, and where on the outer-facing surface of the panel of material at a location corresponding to the foam node a deboss pattern is formed.

Turning now to FIGS. 1 and 2, a front view and a back view respectively of an inner-facing surface of an exemplary apparel item 100 are depicted in accordance with aspects herein. In other words, the apparel item 100 is shown "turned inside out." As shown in FIG. 1, the apparel item 100 may comprise a front panel 110, a first sleeve portion 112, and a second sleeve portion 114. As shown in FIG. 2, the apparel item 100 may further comprise a back panel 210 that together with the front panel 110 help to define at least a neckline opening 116, a waist opening 118 and right and left sleeve openings (not shown) to which the sleeve portions 112 and 114 extend. Although the term front panel and back panel are used, it is contemplated herein that the front panel 110 and the back panel 210 (and optionally the sleeve portions 112, 114) may comprise a unitary panel formed through, for instance, a knitting and/or weaving process and assembled to form the apparel item 100. In another aspect, one or more additional panels (e.g., side panels, additional front panels, additional back panels, shoulder panels) may be used to form the apparel item 100. Further, although shown as a short-sleeve shirt, it is contemplated herein that the apparel item may take the form of a sleeveless shirt, a long sleeve shirt, a jacket, a short, a pant, a sock, a hat, and the like. Any and all aspects, and any variation thereof, are contemplated as being within the scope herein.

In exemplary aspects, the material used to form the front panel 110, the back panel 210, and/or the sleeve portions 112 and 114 may comprise a knitted, woven, or non-woven lightweight fabric. Exemplary weights for the fabric may comprise less than 300 grams per square meter (gsm), less than 250 gsm, less than 200 gsm, less than 150 gsm, less than 140 gsm, and/or less than 130 gsm, although weights above, below, and between these values are contemplated herein. In exemplary aspects, the material may have a degree of elasticity (two-way stretch and/or four-way stretch) imparted by using elastic yarns or fibers such as spandex, elastane, lycra, and the like. The material, in exemplary aspects, may further exhibit moisture-management characteristics (i.e., the ability of a fabric to move moisture from a first face of the fabric to a second opposite face of the fabric), and/or other characteristics such as enhanced air permeability, resistance to water, and the like. Any and all aspects, and any variation thereof, are contemplated as being within the scope herein.

With respect to FIG. 1, one or more foam nodes 120 may be applied to the inner-facing surface of the front panel 110 such that they extend convexly away from the inner-facing surface of the front panel 110 (i.e., in a z-direction toward a body surface of a wearer when the apparel item 100 is worn). Application may be by, for instance, screen-printing, 2-D printing, 3-D printing, manual application, and the like. Similarly, as shown in FIG. 2, the foam nodes 120 may also be applied to the inner-facing surface of the back panel 210 such that they extend convexly away from the inner-facing surface of the back panel 210 (i.e., in a z-direction toward the body surface of a wearer when the apparel item 100 is worn).

In exemplary aspects, the foams nodes 120 may be positioned on the apparel item 100 based on cling or contact maps (maps indicating parts of the body that come into contact with a loose-fitting garment averaged over several athletic positions). However, it is further contemplated herein that the foam nodes 120 may be positioned on the apparel item 100 based on, for example, skin temperature maps, sweat maps, air pressure maps, and the like For instance, and as shown in FIGS. 1 and 2, based on contact maps the foam nodes 120 may be positioned along the sides of the apparel item 100 from a location generally inferior to the sleeve openings for the first and second sleeve portions 112 and 114 to an area generally near the bottom edge of the apparel item 100 (i.e., within 5 cm to 40 cm of the bottom edge of the apparel item 100). This area is typically associated with moderate to high amounts of cling or contact between the apparel item 100 and the wearer's body surface. Other areas known to have moderate to high cling may comprise for instance the superior region of the front panel 110 and/or the superior region of the back panel 210. These areas may correspond to the upper chest area and upper back area of the wearer when the apparel item 100 is worn. Additional areas may comprise, for instance, the sleeve portions 112 and 114 in areas configured to be positioned adjacent to the shoulder or deltoid area of the wearer. When the apparel item 100 is in the form of a pant, the foam nodes 120 may be positioned along an anterior aspect of the leg portions of the pant such that they are positioned adjacent to the quadriceps muscle group of the wearer when the pant is worn, and they may be positioned along a posterior aspect of the leg portions of the pant such that they are positioned adjacent to the calf muscles of the wearer. Any and all aspects, and any variation thereof, are contemplated as being within aspects herein. By providing stand-off in these areas, the perception of cling may be reduced thereby improving wearer comfort.

Continuing, in exemplary aspects, the foam nodes 120 may also be positioned at areas of the apparel item 100 that correspond to moderate to high sweat-producing areas of the wearer. For instance, the nodes 120 may be positioned at the superior, central region of the front panel 110 and/or the superior, central region of the back panel 210 (areas corresponding to the upper chest area and upper back area of the wearer when the apparel item 100 is worn). By providing stand-off in these areas, air may circulate in the space between the inner-facing surface of the apparel item 100 and the wearer's skin surface and thus promote evaporative cooling.

In an optional aspect, some or all of the nodes 120 may be perforated to form a fluid communication path from the inner-facing surface of the apparel item 100 to the outer-facing surface of the apparel item 100. The perforations may provide an exit point for moisture vapor produced by the wearer to exit the apparel item 100 and/or may provide an ingress path for air from the external environment to enter the apparel item 100.

The depiction of the location, size, pattern, and orientation of the foam nodes 120 in FIGS. 1 and 2 are exemplary only, and it is contemplated herein that other locations, sizes, patterns, and orientations for the nodes 120 may be within the scope of this disclosure. For instance, the nodes 120 may be located on the sleeve portions 112 and 113 as well as the other locations described above. The nodes 120 are generally depicted relatively large in size for illustrative purposes. Exemplary dimensions for the nodes 120 may vary depending on the particular pattern associated with each node, but in general each node may range from 0.5 cm to 4 cm in length and from 0.5 cm to 2 cm in width. As will be explained in greater depth below with respect to FIG. 7, exemplary heights of the nodes 120 may comprise between 1 mm up to 6 mm. Any and all aspects, and any variation thereof, are contemplated as being within the scope herein.

Figure 6:
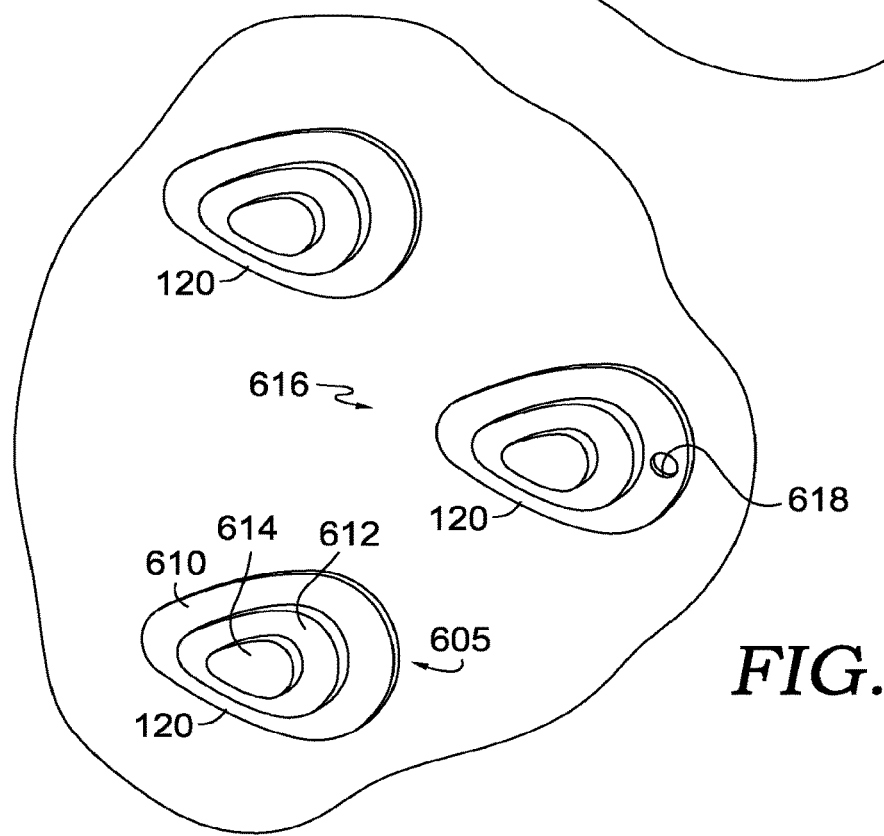
FIG. 6 illustrates a close-up view of the inner-facing surface of the exemplary apparel item of FIG. 1 in accordance with aspects herein.

Turning now to FIG. 6, a close-up view of a portion of the foam nodes 120 taken at the area indicated on FIG. 1 is provided in accordance with aspects herein. The foam nodes 120 are depicted as having multiple layers, although it is contemplated herein that one or more of the nodes 120 may comprise a single layer or just two layers. For example, for the node indicated by reference numeral 605, a first layer 610 is shown as well as a second layer 612, and a third layer 614. As depicted, the first layer 610 occupies a greater surface area than the second layer 612, and the second layer 612 occupies a greater surface area than the third layer 614. By gradually decreasing the surface area associated with the layers 610, 612, and 614 respectively as illustrated, the area of contact with the wearer's skin surface is minimized which may help to improve wearer comfort. In other words, the third layer 614, which is the top layer of the node 605, may comprise the smallest surface area as this layer may be configured to be in contact with the wearer's skin when the apparel item 100 is worn. As will be explained in greater depth below, by graduating the surface area occupied by the different layers 610, 612, and 614, the deboss pattern produced by the respective node may be sculpted to have a shape generally matching that of the respective node (e.g., a greater depth of the deboss pattern in areas corresponding to the third layer 614, and a lesser depth of the deboss pattern in areas corresponding to the first or second layers 610 or 612).

Continuing, in exemplary aspects, the ink formulation for the third layer 614 may be selected to have a soft feel or hand as this layer may be adjacent to a skin surface of the wearer when the apparel item 100 is worn. For instance, a silicone-based ink formulation may be selected as these formulations generally have a soft feel and exhibit a degree of elasticity that allows them to stretch without cracking or breaking. Ink formulations that are considered to be hypoallergenic may also be selected to reduce the chances of skin irritation. Moreover, different finishes may be applied to the third layer 614 to further increase the soft feel and/or comfort of the third layer 614. Examples include flocking, creating a "suede-type" finish using one or more additives, and the like. In one example, an additive, such as glass beads, may be added to the ink formulation for the third layer 614 to create a slick or smooth surface.

As further shown in FIG. 6, one or more of the nodes 120 may be perforated. For instance, the node indicated by the reference numeral 616 comprises a perforation 618 that extends through the node 616 and the underlying base material of the apparel item 100. In other words, the perforation 618 forms a fluid communication path from the inner-facing surface of the apparel item 100 to the outer-facing surface of the apparel item 100. The perforation 618 may be formed by a mechanical process, laser cutting, water-jet cutting, ultrasonic cutting, and the like. Although only one perforation is shown, it is contemplated herein that multiple perforations may extend through the node 616 and the underlying base material of the apparel item 100.

The location of the perforation 618 on the node 616 may be selected based on the shape configuration of the node 616. For instance, and as will be more fully explained below, the perforation 618 may be located near the trailing edge of the node 616 (the edge of the node 616 that is further away from the vertical midline of the front panel 110). By positioning the perforation 618 in this location, air traveling over the front of the apparel item 100 may be channeled toward and into the perforation 618 to optimize air flowing into the apparel item 100. However, it is also contemplated herein that the perforation 618 may be located at other areas of the node 616 (e.g., at a leading edge, midway between the leading edge and the trailing edge, and the like). Any and all aspects, and any variation thereof, are contemplated as being within aspects herein.

Figure 8:
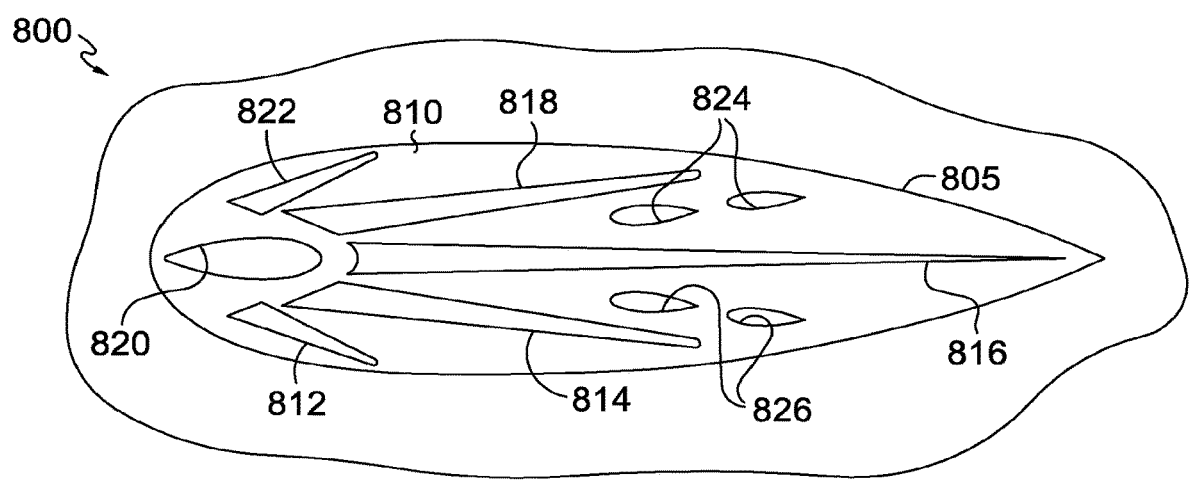
FIG. 8 illustrates a top-down view of an exemplary foam node in accordance with aspects herein.

It is further contemplated herein, that perforations may also be formed in one or more areas adjacent to the node 616. In other words, perforations may extend through the base textile surrounding the node 616. This aspect is illustrated in FIG. 8 which depicts a top view of an exemplary foam node structure 805 printed on a base material 800. The foam node structure 805 comprises a primer layer 810 which, in exemplary aspects, may comprise a clear silicone base. In exemplary aspects, the primer layer 810 may not contain a foaming additive. The primer layer 810 may be applied to the base material 800 (via, for instance, a screen printing process, a 2-D printing process, a 3-D printing process, a manual application, and the like), and may help to reinforce or seal the base material 800 in areas where foam nodes are located. The foam node structure 805 further comprises a plurality of foam elements 812, 814, 816, 818, and 822 printed on to the primer layer 810. In exemplary aspects, perforations, such as perforations 820, 824 and 826 may be formed through just the primer layer 810 of the foam node structure 805. Although not shown, additional perforations may be formed through one or more of the foam elements 812, 814, 816, 818, or 822. By reinforcing the base material 800 with the primer layer 810, the perforations 820, 824, and 826 are less likely to tear or extend beyond their original boundaries thereby helping to maintain the structural integrity of the base material 800. The pattern associated with the foam node structure 805 is exemplary only, and it is contemplated herein that other patterns for the primer layer and/or the foam elements are within the scope of the disclosure.

Turning now to FIGS. 3 and 4, front and back views respectively of an outer-facing surface of the apparel item 100 are depicted in accordance with aspects herein. In exemplary aspects, the outer-facing surface of the apparel item 100 may comprise debossed regions 320 that correspond to the underlying foam nodes 120. A depiction of how the debossed regions 320 are formed is illustrated in FIGS. 7A-7D.

FIG. 7A illustrates a cross-sectional view of a base material 700 having an inner-facing surface 710 and an outer-facing surface 712 in accordance with aspects herein. Although the process below is described for the application of an ink having a foaming additive to the inner-facing surface 710, it is contemplated herein that the application could also be to the outer-facing surface 712 (or both the inner-facing surface 710 and the outer-facing surface 712). The base material 700 may, in exemplary aspects, have a weight between 130 gsm and 300 gsm (i.e., may be formed of a lightweight material). Moreover, the base material 700 may also have a degree of elasticity such that its modulus of elasticity is above a threshold value.

A first layer 714 of ink having a foaming additive is printed on to the inner-facing surface 710 of the base material 700. A partial-curing step (e.g., a flash-curing step) is then carried out as indicated by the arrow to help set the ink and to begin activation of the foaming additive. FIG. 7B illustrates the base material 700 after the initial curing step. The first layer 714 has expanded in all directions (e.g., in an x-direction, a y-direction, and a z-direction) due to activation of the foaming additive by the heat as indicated by the arrows in FIG. 7B. As such, the first layer 714 extends convexly away from the inner-facing surface 710. Because the layer 714 is adhered to the underlying base material 700, as the layer 714 expands in all directions, it may "lift" the underlying base material 700. This may be possible due to the lightweight and elastic nature of the material. The result is that the base material 700 "puckers" to form a debossed region 716 on the outer-facing surface 712 of the base material 700. As shown, the debossed region 716 extends concavely away from the outer-facing surface 712 of the base material 700. In exemplary aspects, the specific formulation of the ink and/or foaming additive, parameters associated with the curing or activation process, as well as the application pattern may be selected to achieve this deboss effect.

FIG. 7C illustrates the base material 700 at a point when a second layer 718 of ink having a foaming additive (which may be the same formulation or a different formulation than the first layer 714) is printed on to the surface of the first layer 714 of partially cured ink. A second partial-curing step (e.g., a flash-curing step) is then carried out as indicated by the arrow. FIG. 7D illustrates the base material 700 after the second curing step. The second layer 718 has expanded in all directions (as indicated by the arrows) due to the activation of the foaming additive by the heat. The activation of the second layer 718 may cause further lifting or puckering of the underlying base material 700 to increase the amount of offset associated with the debossed region 716. In exemplary aspects, a minimum depth for the debossed region 716 may comprise between 0.5 mm and 1.0 mm. Moreover, the degree of puckering or degree of deboss of the base material 700 may be more pronounced in areas corresponding to the second layer 718. Thus, by varying the application patterns for the different layers of a particular foam nodes, the shape of the deboss pattern may be sculpted or modified so that greater deboss is achieved in areas corresponding to multiple layers of ink/foaming additive and lesser deboss is achieved in areas corresponding to single layers of the ink/foaming additive formulation. After all the layers have been applied, a final curing step may be carried out to set the ink and to optionally complete activation of the foaming additive.

The height of the debossed region 716 when combined with the height of the first and second layers 714 and 718 (and/or optional additional layers) may create a total stand-off height for the resulting node of between 1.5 mm to 6 mm, between 3 mm to 5 mm, or between 3 mm to 4 mm as indicated by the reference numeral 722. It is contemplated herein that additional layers of ink with a foaming additive may be added, while balancing comfort to the wearer, to further increase the stand-off height of the resulting node.

Returning now to FIGS. 3 and 4, the shape, pattern, and location of the debossed regions 320 correspond to the shape, pattern, and location of the underlying foam nodes 120. This is shown more clearly in FIG. 5 which depicts a close-up view of the debossed regions 320 taken at the area indicated on FIG. 3. As shown, the debossed regions 320 comprise indentations or offsets in the fabric forming the outer-facing surface of the apparel item 100. In other words, the debossed regions 320 project concavely inward from the outer-facing surface of the apparel item 100 (i.e., toward a body surface of a wearer when the apparel item 100 is in an as-worn configuration). The debossed regions 320 have a shape and location corresponding to the shape and location of the underlying foam nodes 120 (shown in FIG. 6). The perforation 618 (also shown in FIG. 6) is depicted as extending through the debossed region 320 to form a communication path from the outer-facing surface to the inner-facing surface of the apparel item 100.

Figure 9A:
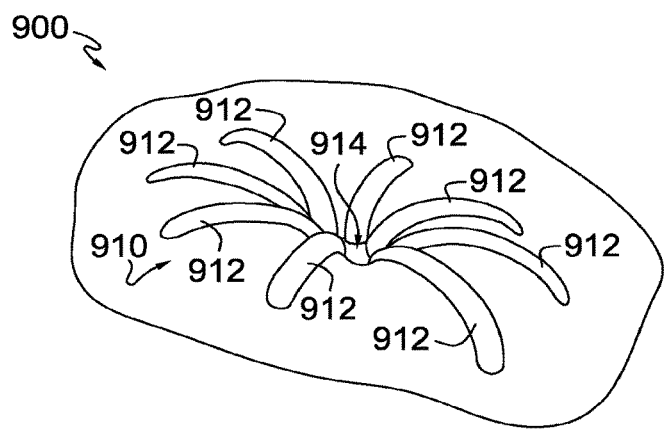
FIG. 9A illustrates an exemplary foam node on a first surface of a textile in accordance with aspects herein.
Figure 9B:
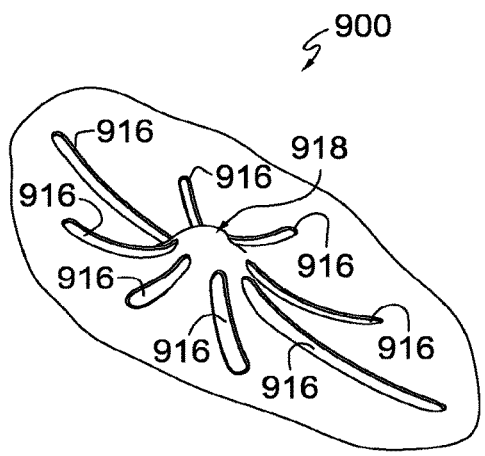
FIG. 9B illustrates a second opposite surface of the textile of FIG. 9A in accordance with aspects herein.

In exemplary aspects, different patterns of foam nodes may be used to simultaneously achieve a deboss effect and an emboss effect on the outer-facing surface of the apparel item 100 in accordance with aspects herein. This aspect is illustrated in FIGS. 9A-9B, and FIGS. 10A-10B. FIG. 9A illustrates a perspective view of a first surface of a base material 900 having a foam node 910 printed thereon. The foam node 910 comprises a series of foam arms 912 that radially extend away from a central area 914, where the central area 914 does not have any foam ink printed thereon. The emboss/deboss effect achieved by this pattern can be seen in FIG. 9B which illustrates a second opposite-facing surface of the base material 900. As shown in FIG. 9B, the foam arms 912 have created a corresponding set of debossed channels 916 on the second surface of the base material 900. An embossed region 918 is created at the center of the debossed channels 916, where the embossed region 918 corresponds to the central area 914 between the foam arms 912 of the foam node 910. As shown, the embossed region 918 extends convexly away from the second surface. In exemplary aspects, the embossed region 918 may be created due to a radial puckering or "drawing-in" of the surrounding fabric by the foam arms 912 causing the material at the embossed region 918 to be pushed outwardly away from the surface plane of the base material 900. In exemplary aspects, a minimum height of the embossed region 918 may comprise between 0.5 mm and 1.0 mm.

Figure 10A:
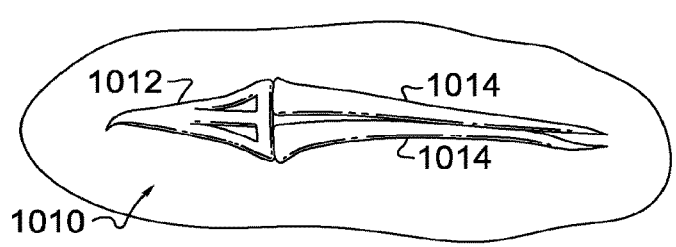
FIG. 10A illustrates an exemplary foam node on a first surface of a textile in accordance with aspects herein.
Figure 10B:
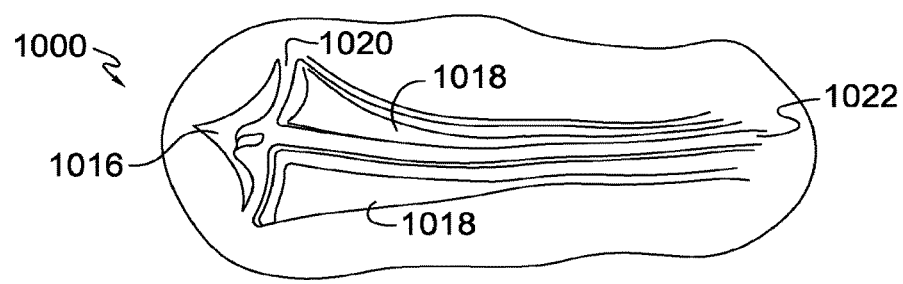
FIG. 10B illustrates a second opposite surface of the textile of FIG. 9A in accordance with aspects herein.

FIGS. 10A and 10B illustrate another emboss/deboss pattern created by utilizing a particular configuration for the foam node. FIG. 10A depicts a first surface of a base material 1000 having a foam node 1010 printed thereon. The foam node 1010 comprises a plurality of separate elements including at least a triangular element 1012 and two leg elements 1014. Areas of the base material 1000 between the triangular element 1012 and the leg elements 1014, and between the two leg elements 1014 do not have any foam ink material printed thereon. The emboss/deboss effect achieved by this pattern can be seen in FIG. 10B which illustrates a second opposite-facing surface of the base material 1000. As shown in FIG. 10B, the triangular element 1012 and the two leg elements 1014 have created corresponding deboss regions 1016 and 1018 respectively. The deboss regions 1018, in particular, form channels or paths on the base material 1000. Embossed regions 1020 and 1022 are created between the deboss region 1016 and 1018, and between the two debossed regions 1018 respectively.

Thus, in general, when a foam node comprises a unitary or single-piece construction (i.e., formed without utilizing separate foam elements), a corresponding deboss pattern is formed on the opposite surface. However, when a foam node comprises a number of separate elements clustered together, both a deboss pattern and an emboss pattern may be formed on the opposite surface where the deboss pattern corresponds to the separate foam elements, and the emboss pattern is formed in the spaces between the separate foam elements. It is contemplated herein, that any number of foam nodes patterns may be formed on the base material with a corresponding number of deboss/emboss patterns formed on the second opposite surface.

From a functional perspective, forming the underlying foam nodes 120 in specific shapes and/or patterns may help to achieve certain functional benefits for the outer-facing surface of the apparel item 100. For instance, foam nodes having a shape similar to the foam nodes 120 may be formed over the majority of the inner-facing surface of, for example, the front panel 110 of the apparel item 100. Corresponding debossed regions 320 would be formed on the outer-facing surface of the apparel item 100 (similar to the dimples formed on a golf ball). When air flows over the front panel 110 (due to, for instance, a running action by the wearer), the debossed regions 320 would create a degree of turbulence in the air. As the air travel around the sides and shoulders of the apparel item 100, the turbulence may help the flowing air to conform more closely to the wearer creating a smaller vortex and less drag.

Figure 13:
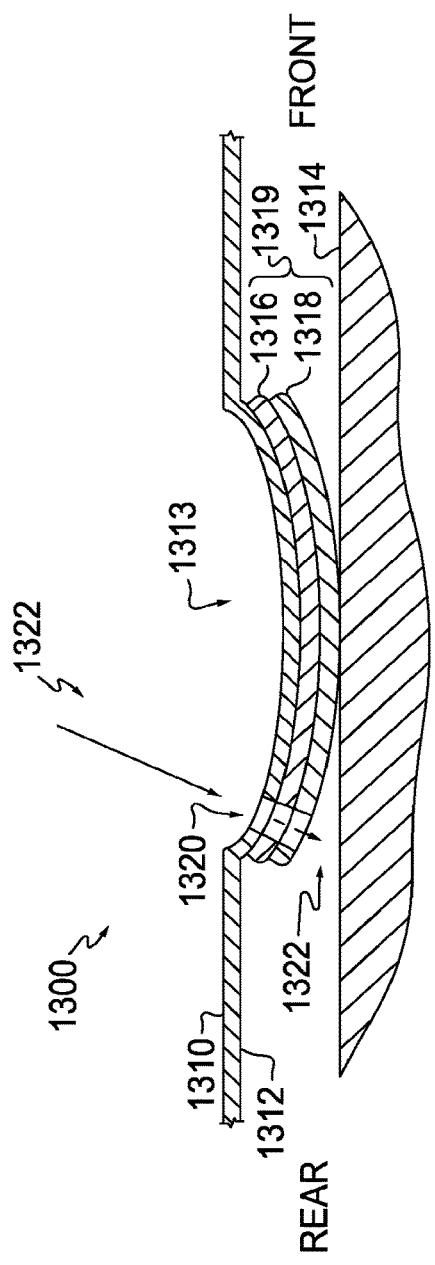
FIG. 13 illustrates a cross-sectional view of an exemplary perforated foam node in accordance with aspects herein.

As briefly discussed above, another benefit may be achieved by forming the nodes 120 in an ovoid or elliptical shape, orienting the foam nodes 120 such that their long-axes extend along a generally horizontal plane, and perforating the nodes 120 at their trailing edges. This aspect is shown more clearly in FIG. 13 which depicts a cross-sectional view of a portion of a base material 1300 of an apparel item, such as the apparel item 100, being worn by a wearer. The inner-facing surface of the base material 1300 is indicated by the reference numeral 1312, the outer-facing surface of the base material 1300 is indicated by the reference numeral 1310, and the skin surface of the wearer is indicated by the reference numeral 1314. A foam node 1319 having a first layer 1316 and a second layer 1318 is printed on to the inner-facing surface 1312 of the base material 1300 such that it is generally in contact with the wearer's skin surface 1314 when the apparel item is worn. A corresponding debossed region 1313 is formed on the outer-facing surface 1310 of the base material 1300. And a perforation 1320 is formed through the first and second layers 1316 and 1318 as well as the base material 1300.

Continuing, the node 1319 is positioned such that its long axis lies along a generally horizontal plane of the apparel item when the apparel item is worn, and the perforation 1320 is positioned at the rear of the node 1319. To put it another way, the perforation 1320 is positioned at a trailing edge of the node 1319. Air flow is indicated by the arrow 1322 and is shown traveling generally from the front (indicated) to the rear (indicated) of the apparel item. The debossed region 1313, in exemplary aspects, may help to capture and funnel the air flow 1322 such that it enters the perforation 1320 and circulates in the space between the inner-facing surface 1312 of the base material 1300 and the wearer's skin surface 1314 where it may help to cool the wearer by promoting evaporative heat transfer.

Figure 14:
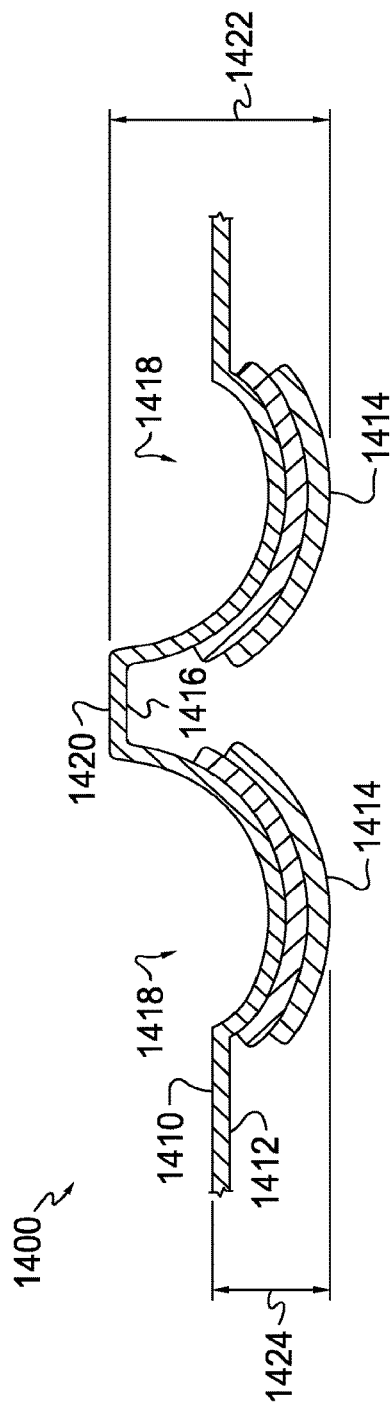
FIG. 14 illustrates a cross-sectional view of an exemplary foam node on a first surface of a base material that creates an emboss pattern and a deboss pattern on a second opposite surface of the base material in accordance with aspects herein.

In another example, by using a foam node pattern similar to that shown in FIG. 9A, a greater degree of stand-off may be achieved. This aspect is illustrated in FIG. 14 which depicts a cross-sectional view of a base material 1400 having a foam node printed thereon similar to that shown in FIG. 9A. More specifically, the base material 1400 comprises a first surface 1410 and a second opposite surface 1412. Two foam arms 1414, each having two layers, are shown printed on the second surface 1412. Reference numeral 1416 indicates a central area on the second surface 1412 that does not have foam ink material printed thereon, where the central area 1416 is located between the foam arms 1414. On the first surface 1410 of the base material 1400, debossed regions 1418 are created that correspond to the foam arms 1414, and an embossed region 1420 is formed that corresponds to the central area 1416. A height 1422 taken from top of the embossed region 1420 to the lowermost point of the foam arms 1414 is greater than a height 1424 taken from the surface plane of the base material 1400 to the lowermost point of the foam arms 1414. Thus, greater stand-off may be achieved by utilizing a foam node pattern that creates debossed regions as well as embossed regions.

In exemplary aspects, a perforation may be formed through the embossed region 1420 to help channel air into and out of the base material 1400. This may be advantageous when the embossed region 1420 is formed on the outer-facing surface of the base material 1400 such that the embossed region 1420 represents an area of the apparel item that projects furthest away from the surface plane of the base material 1400. Thus, the embossed region 1420 may be positioned such that it is better exposed to air traveling over the base material 1400, and air may enter the base material 1400 via the perforation. Any and all aspects, and any variation thereof, are contemplated as being within the scope herein.

Another functional advantage may be obtained by using a foam node having elements that create debossed channels or paths on the opposite surface. For instance, a foam node having leg elements similar to those shown in FIG. 10A may be used to create channel or paths on the opposite surface of the base textile (such as the debossed regions 1018 in FIG. 10B). These channels or paths may be used to guide air flowing over the apparel item (e.g., guide air to one or more perforations or vent openings), and or to guide water flowing over the apparel item (e.g., guide rain or precipitation to shed points using the channels). It is contemplated that any number of foam node patterns may be used on a single apparel item to achieve some of the functional benefits described above: creating stand-off, guiding air flow, guiding water flow, promoting breathability, and the like.

Figure 16A:
FIGS. 16A-16H illustrate exemplary shapes for foam nodes in accordance with aspects herein.

FIGS. 16A-16H illustrate some additional exemplary foam node shapes in accordance with aspects herein. The nodes depicted in FIGS. 16A-16H may comprise a single layer or multiple layers of ink. Moreover, the nodes may comprise an optional primer layer. FIG. 16A depicts a node 1600 having an elongate oval shape. In exemplary aspects, the node 1600 may have a length between, for example, 10 mm and 40 mm and have a stand-off height between, for example, 2.5 mm and 7.5 mm.

Figure 16B:
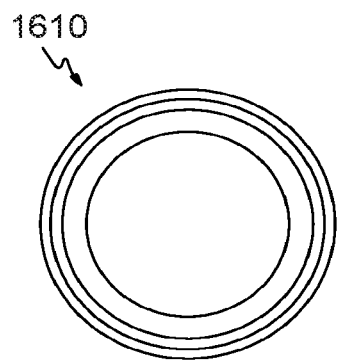
Figure 16C:
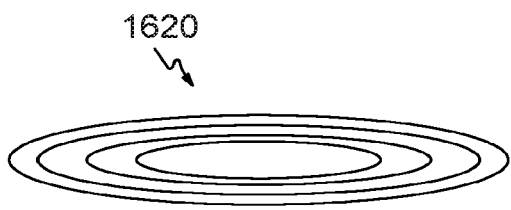
Figure 16D:
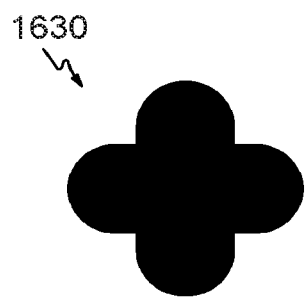
Figure 16E:
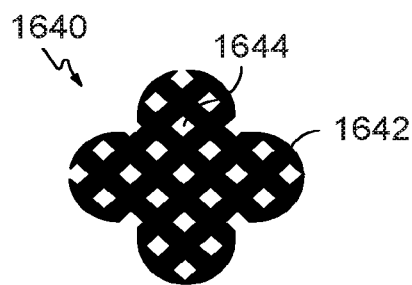

FIG. 16B depicts a node 1610 have a circular shape. In exemplary aspects, the node 1610 may have a diameter between 4.5 mm and 30 mm and have a stand-off height between 2.5 mm and 7.5 mm. FIG. 16C depicts a node 1620 having an ellipsoid shape. In exemplary aspects, the long axis of the node 1620 may have a length between 10 mm and 35 mm, and the node 1620 may have a stand-off height between, for instance, 2.5 mm and 7.5 mm. FIG. 16D depicts a node 1630 having a generally quatrefoil shape. The node 1630 may have a length between, for example, 5.5. mm and 12.5 mm and have a stand-off height between, for instance, 2.5 mm and 6.5 mm.

Figure 16F:
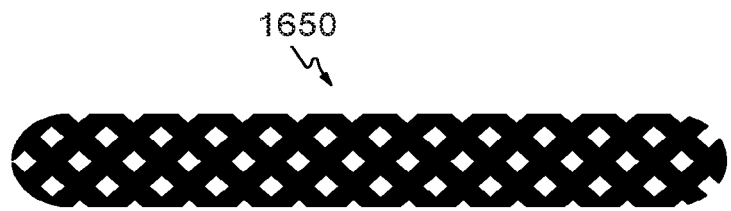

FIGS. 16E-16H depict exemplary shapes for nodes comprising areas with foam ink and areas without foam ink. For example, FIG. 16 depicts a node 1640 with a quatrefoil shape comprising areas 1642 with foam ink and areas 1644 without foam ink. The node 1640 may have a length between 5.5 mm and 12.5 mm and a stand-off height between 2.5 mm and 6.5 mm. FIG. 16F depicts a node 1650 with an elongated oval shape. The node 1650 may have a length between, for example, 34 mm and 36 mm and have a stand-off height between 2.5 mm and 7.5 mm.

Figure 16G:
Figure 16H:
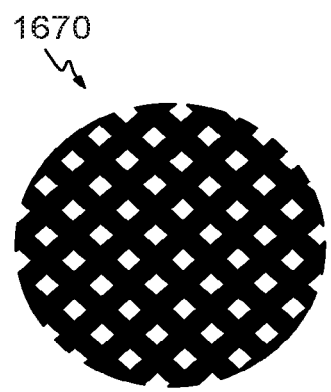

FIG. 16G depicts a node 1660 comprising an ellipsoid shape. The length, as measured along the long axis of the node 1660, may be between 34 mm and 36 mm, and the node 1660 may have a stand-off height between 2.5 mm and 7.5 mm. FIG. 16H depicts a node 1670 having a circular shape. The node 1670 may have a diameter between 4.5 mm and 30 mm and have a stand-off height between 2.5 mm and 6.5 mm. Any and all aspects, and any variation thereof, are contemplated as being within aspects herein.

Figure 12:
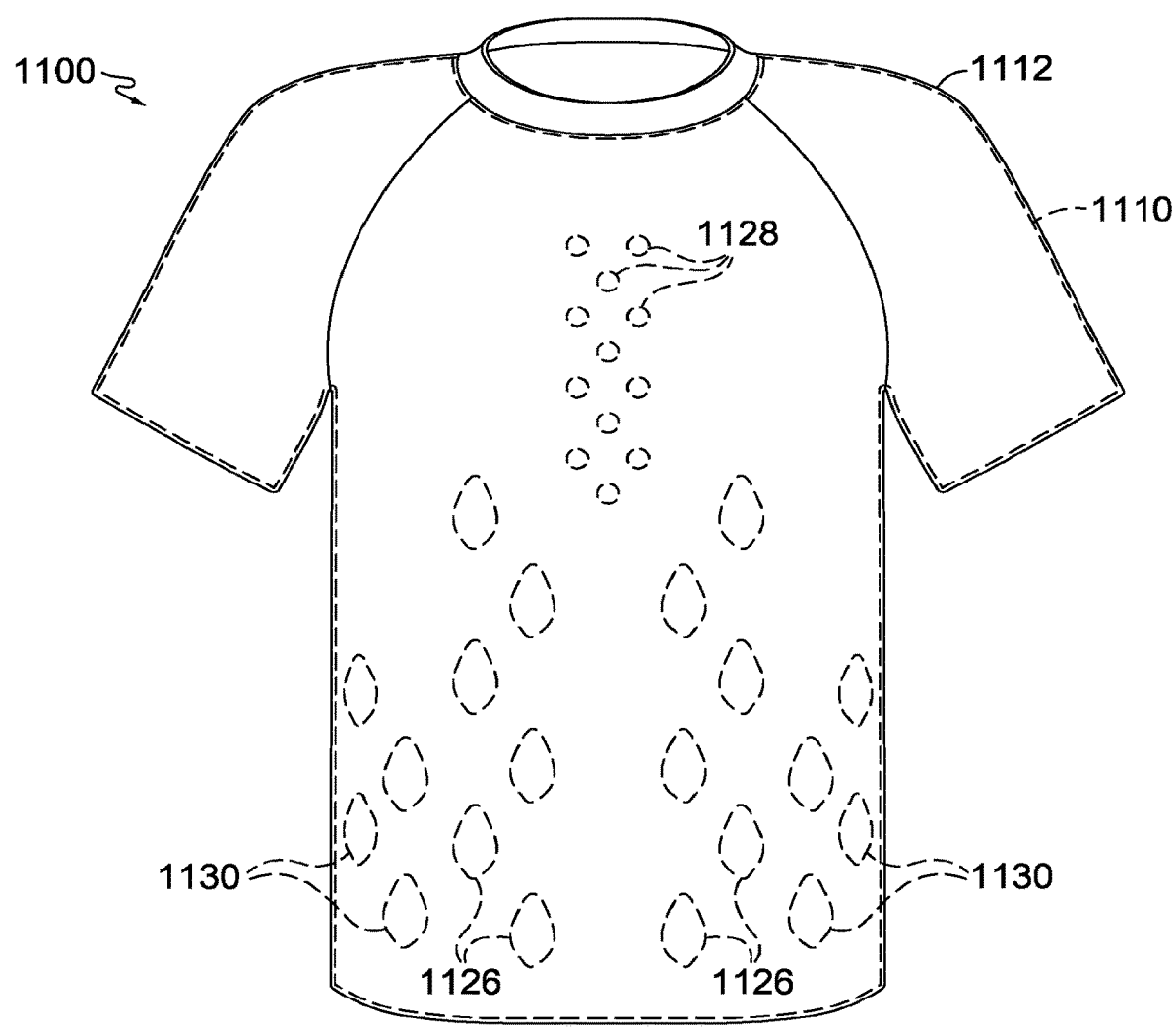
FIG. 12 illustrates the exemplary apparel system of FIG. 11 in an as-assembled configuration in accordance with aspects herein.

In additional exemplary aspects herein, an apparel system is contemplated that utilizes printed foam nodes to create stand-off between, for instance, a base layer and a wearer's skin surface, between the base layer and an overlying layer, between a mid-layer and an outer layer, and the like. This aspect is illustrated in FIGS. 11-12. FIG. 11 depicts an exploded view of an exemplary apparel system 1100 that utilizes printed foam nodes in accordance with aspects herein. The system 1100 is comprised of a base layer inner article 1110 and an outer article 1112. In exemplary aspects, the base layer inner article 1110 may comprise at least a front panel 1118, and a back panel (not shown) that help to define in part at least a neckline opening, a waist opening, and first and second sleeve openings. The base layer inner article 1110 may further optionally comprise a first sleeve portion 1114 and a second sleeve portion 1116. Although depicted as a shirt, it is contemplated herein that the base layer inner article 1110 may be in the form of a pant, shorts, a glove, a sock, a hat, and the like.

As the base layer inner article 1110 is contemplated as a base layer having direct contact with a wearer's skin when worn, the base layer inner article 1110 may be formed from a material that is acceptable for skin contact. For example, the base layer inner article 1110 may be formed from a lightweight knit or woven material. In exemplary aspects, the base layer inner article 1110 may exhibit moisture-management characteristics.

The outer article 1112 is contemplated as being worn over the base layer inner article 1110 when in an assembled configuration. In exemplary aspects, the outer article 1112 may be unaffixed to the base layer inner article 1110 prior to being donned. However, it is also contemplated that the outer article 1112 may be affixed to the base layer inner article 1110 in one or more locations. The outer article 1112 may comprise at least a front panel 1124, and a back panel (not shown) that together with the front panel help to define at least in part a neckline opening, a waist opening, and first and second sleeve openings. The outer article 1112 may further optionally comprise a first sleeve portion 1120 and a second sleeve portion 1122. In general, the outer article 1112 corresponds in shape to the base layer inner article 1110. As such, when the base layer inner article 1110 is configured as a pant, shorts, a glove, a sock, or a hat, the outer article 1112 would assume a similar configuration.

Because the outer article 1112 is contemplated as the layer in contact with the external environment when worn, the outer article 1112 may be formed of a material suitable for this type of contact. Thus, in exemplary aspects, the outer article 1112 may comprise a knitted or woven material having a heavier weight and/or greater durability than the base layer inner article 1110 (although, in exemplary aspects, the outer article 1112 may still have a weight less than 300 gsm). Further, the outer article 1112, in exemplary aspects, may be treated with a durable water repellant (DWR) finish.

The depiction of the base layer inner article 1110 and the outer article 1112 in FIGS. 11 and 12 focuses on the use of foam nodes to provide offset between, for instance, the base layer inner article 1110 and the wearer's skin and/or between the outer article 1112 and the base layer inner article 1110. As such, the debossed/embossed features described above are not shown in FIGS. 11 and 12 although it is contemplated herein that each of the articles 1110 and 1112 may include the emboss/deboss features described above to provide the functional benefits described above.

With respect to the base layer inner article 1110, it is contemplated herein that the article 1110 may comprise a set of foam nodes 1126 located on the inner-facing surface of the base layer inner article 1110 (as indicated by the dashed lines in FIG. 11). The foam nodes 1126 may provide stand-off between the inner-facing surface of the base layer inner article 1110 and the wearer's skin surface. The stand-off may help to reduce the perception of cling as well as provide a space in which air can circulate to help cool the wearer by promoting, for instance, evaporative heat transfer. In exemplary aspects, some or all of the nodes 1126 may comprise perforations to provide a communication path from the inner-facing surface to the outer-facing surface of the base layer inner article 1110. This, in turn, may help promote breathability of the base layer inner article 1110. The size and placement of the foam nodes 1126 is illustrative and exemplary only, and it contemplated herein, that the nodes 1126 may be different sizes or be located in other areas of the base layer inner article 1110 (e.g., the back, the sleeves, and/or front middle of the article 1110). Any and all aspects, and any variation thereof, are contemplated as being within the scope herein.

Continuing, in exemplary aspects, the base layer inner article 1110 may optionally further comprise foam nodes 1130 located on the outer-facing surface of the article 1110. The nodes 1130 may have a different shape configuration or the same shape configuration as the foam nodes 1126. The foam nodes 1130 may be used to provide stand-off between the base layer inner article 1110 and the outer article 1112 as will be explained in greater depth below. Some or all of the foam nodes 1130 may comprise perforations extending therethrough. The location and size of the foam nodes 1130 is exemplary only, and it is contemplated herein, that the foam nodes 1130 may be located in other areas (e.g., the sides, sleeve portions, and/or back of the base layer inner article 1110) and/or be different sizes and shapes. Any and all aspects, and any variation thereof, are contemplated as being within the scope herein.

The outer article 1112 may further comprise foam nodes 1128 located on the inner-facing surface of the outer article 1112 (as indicated by the dashed lines). The foam nodes 1128 may produce stand-off from the base layer inner article 1110. In other words, the foam nodes 1128 alone, or in combination with the optional foam nodes 1130, may help to create a space between the outer-facing surface of the base layer inner article 1110 and the inner-facing surface of the outer article 1112. Air that has been warmed by the wearer may circulate in this space to provide an insulative effect. In exemplary aspects, one or more of the foam nodes 1128 may be perforated to provide an egress point for moisture vapor to exit the apparel system 1100 and/or an ingress point for ambient air to enter the space between the outer article 1112 and the base layer inner article 1110. The location and size of the foam nodes 1128 is exemplary only, and it is contemplated herein, that the foam nodes 1128 may be located in other areas (e.g., the sides, sleeve portions, upper front, and/or back of the outer article 1112) and/or be different sizes and shapes. Any and all aspects, and any variation thereof, are contemplated as being within the scope herein.

Moreover, in exemplary aspects, the location and/or pattern of the foam nodes 1128 located on the outer article 1112 may be complementary to the location and/or pattern of the foam nodes 1126 and optionally the foam nodes 1130 located on the base layer inner article 1110. For instance, the respective nodes 1126, 1128, and/or 1130 may be positioned such that they do not directly contact each other when the apparel system 1100 is worn. This aspect is illustrated in FIG. 12 which depicts the outer article 1112 positioned over the base layer inner article 1110 (shown by the dashed lines). As shown, the nodes 1126, 1128, and 1130 are positioned on the respective articles such that they do not directly contact each other. By configuring the nodes as such, a greater percentage of stand-off over the apparel system 1100 may be achieved without utilizing an increased number of foam nodes. This, in turn, may help keep manufacturing costs down and also improve wearer comfort. However, it is contemplated herein that there may be examples where foam nodes located on either the base layer inner article 1110 or the outer article 1112 may contact or partially contact one another. Further, it is contemplated herein, that the amount of stand-off associated with the foam nodes 1126 and 1130 may be the same, less than, or greater than the amount of stand-off associated with the nodes 1128. Moreover, it is contemplated herein, that foam nodes may be located just on the inner-facing surface of the outer article 1112 (and not on the base layer inner article 1110), or on just the outer-facing surface of the base layer inner article 1110 to provide stand-off between the base layer inner article 1110 and the outer article 1112. Any and all aspects, and any variation thereof, are contemplated as being within the scope herein.

Figure 15:
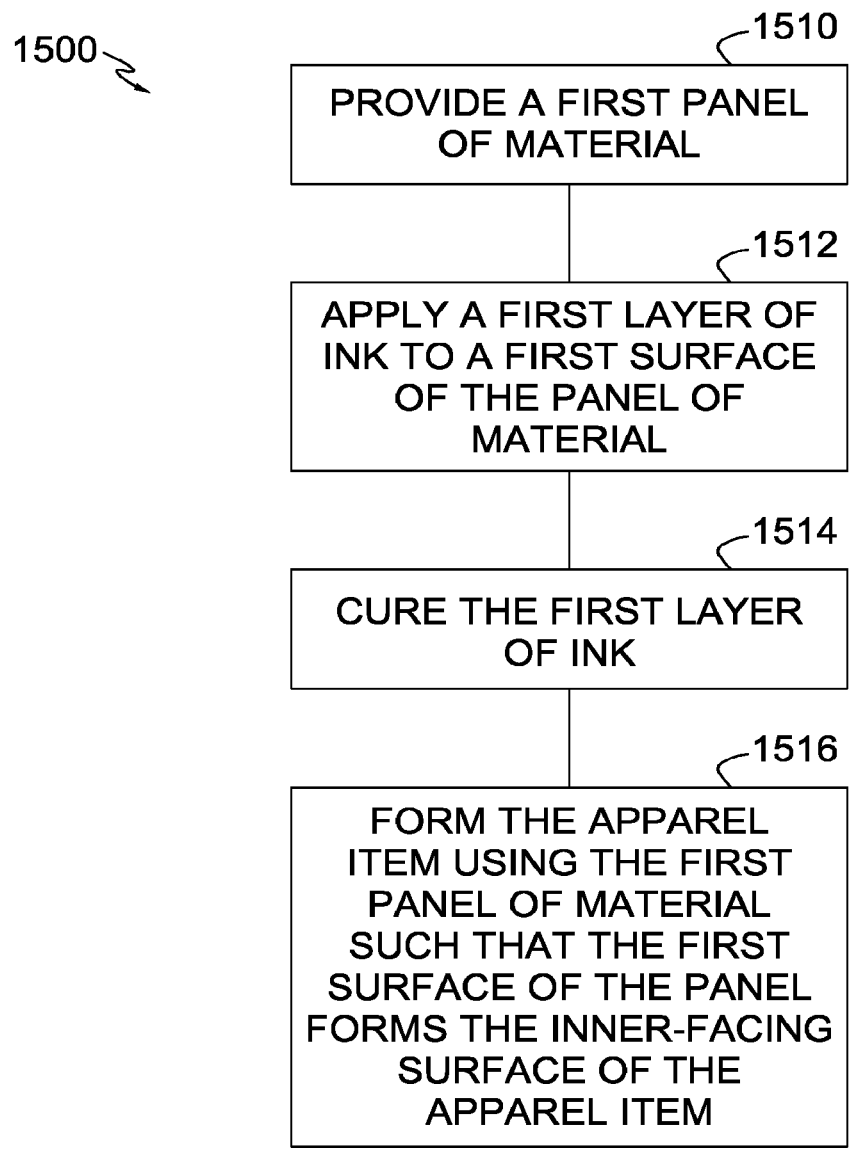
FIG. 15 illustrates a flow diagram of an exemplary method of manufacturing an apparel item having one or more foam nodes in accordance with aspects herein.

Turning now to FIG. 15, a flow diagram of an exemplary method 1500 of manufacturing an apparel item, such as the apparel item 100, having one or more printed foam ink nodes is illustrated in accordance with aspects herein. At a step 1510, a first panel of material is provided, where the first panel of material has a first surface and a second surface opposite of the first surface. In exemplary aspects, the first panel of material may be comprise a knitted or woven material having a weight less than or equal to, for instance, 300 gsm and having a modulus of elasticity above a predefined threshold.

At a step 1512, at least a first layer of ink having a foaming additive is printed on or applied to at least a portion of the first surface of the panel of material, where the first layer of ink is applied in a predetermined pattern. In exemplary aspects, the ink may be applied by utilizing a screen printing process, a 2-D printing process, a 3-D printing process, manual application, and the like. In some exemplary aspects, prior to applying the first layer of ink, an optional primer layer may be applied to the first surface, where the primer layer may comprise a clear silicone-based layer with or without a foaming additive. When used, the primer layer may be partially cured before the method 1500 continues.

At a step 1514, the first layer of ink is partially cured to help activate the foaming additive and to help at least partially set the ink formulation. The method 1500 may further comprise applying one or more additional layers of ink/foaming additive formulations on top of the first layer, where each layer is partially cured before application of the next layer. Each of the layers, including the primer layer when used, may be applied in a different pattern or the same pattern as the preceding layer. Further, each of the layers may occupy a smaller surface area than the preceding layer such that the top layer occupies the smallest surface area compared to the other layers. In exemplary aspects, the partial-curing step may comprise exposing the ink/foaming additive formulation to a predefined temperature for a predefined period of time. Different temperatures and/or different time periods may be used for each layer or the same temperature and time period may be used for each layer. Any and all aspects, and any variation thereof, are contemplated as being within the scope herein. In exemplary aspects, an optional top layer that may or may not have a foaming additive may be applied to help seal the resulting foam node and/or to impart a soft feel or texture to the node since the top layer may be in contact with a wearer's skin surface. Further as described above, the top layer may be impregnated with a cooling agent such as, for example, a menthol, spearmint, or peppermint oil that may provide a perception of cooling when it comes into contact with a wearer's skin.

Once all the layers have been applied, a final curing step may be done to fully set the node and to complete the activation of the foaming additive. The final curing step may be at a different temperature and time period than the partial curing steps (e.g., at a higher temperature and for a longer period of time). In exemplary aspects, the partial-curing steps and the final curing step may be achieved using modalities such as infra-red light, ultrasound, radio-frequency waves, chemicals, water, ultra-violet lights, and the like. Any and all aspects, and any variation thereof, are contemplated as being within the scope herein.

At a step 1516, the apparel item is formed using at least the first panel such that when incorporated into the apparel item, the first surface of the panel forms an inner-facing surface of the apparel item. However, it is contemplated herein that the apparel item may be initially formed and the foam nodes applied in a post-processing step. Continuing, the method 1500 may further comprise perforating the foam node via, for instance, a mechanical process, laser cutting, water-jet cutting, ultrasonic cutting, and the like. The steps outlined above for the method 1500 may occur in any order. As mentioned, the foam node may be applied to the first panel after the first panel has been incorporated into the apparel item. Or the foam node may be perforated before or after the first panel has been incorporated into the apparel item. Any and all aspects, and any variation thereof, are contemplated as being within the scope herein.

Aspects of the present invention have been described with the intent to be illustrative rather than restrictive. Alternative aspects will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. An apparel system comprising:
an inner article having an inner-facing surface and an outer-facing surface, the inner article comprising a first set of foam ink nodes located on the inner-facing surface of the inner article, wherein a portion of the first set of foam ink nodes comprise a perforation extending through the respective foam ink nodes and the inner article to form a fluid communication path from the inner-facing surface of the inner article to the outer-facing surface of the inner article; and
an outer article configured to be worn over the inner article, the outer article having an inner-facing surface and an outer-facing surface, the outer article comprising a second set of foam ink nodes located on the inner-facing surface of the outer article.

2. The apparel system of claim 1, the inner article further comprising a third set of foam ink nodes located on the outer-facing surface of the inner article.

3. The apparel system of claim 2, wherein a portion of the third set of foam ink nodes comprise a perforation extending through the respective foam ink nodes and the inner article to form a fluid communication path from the inner-facing surface of the inner article to the outer-facing surface of the inner article.

4. The apparel system of claim 1, wherein a portion of the second set of foam ink nodes comprise a perforation extending through the respective foam ink nodes and the outer article to form a fluid communication path from the inner-facing surface of the outer article to the outer-facing surface of the outer article.

5. The apparel system of claim 1, wherein the inner article comprises a shirt, and wherein the outer article comprises a shirt.

6. The apparel system of claim 1, wherein the inner article is formed from a lightweight knit or woven material.

7. The apparel system of claim 1, wherein the outer article is unaffixed from the inner article.

8. An upper-body apparel system comprising:
an inner article in the form of a shirt, the inner article having an inner-facing surface and an outer-facing surface, the inner article comprising a first set of foam ink nodes located on the outer-facing surface of the inner article, wherein a portion of the first set of foam ink nodes comprise a perforation extending through the respective foam ink nodes and the inner article to form a fluid communication path from the inner-facing surface of the inner article to the outer-facing surface of the inner article; and an outer article in the form of a shirt and configured to be worn over the inner article, the outer article having an inner-facing surface and an outer-facing surface, the outer article comprising a second set of foam ink nodes located on the inner-facing surface of the outer article.

9. The upper-body apparel system of claim 8, wherein when the outer article is worn over the inner article, the second set of foam ink nodes do not contact the first set of foam ink nodes.

10. The upper-body apparel system of claim 8, wherein the first set of foam ink nodes are located on an upper chest portion of a front panel of the inner article.

11. The upper-body apparel system of claim 10, wherein the second set of foam ink nodes are located on a lower chest portion of the front panel of the inner article.

12. The upper-body apparel system of claim 8, wherein a portion of the second set of foam ink nodes comprise a perforation extending through the respective foam ink nodes and the outer article to form a fluid communication path from the inner-facing surface of the outer article to the outer-facing surface of the outer article.

13. The upper-body apparel system of claim 8, wherein the inner article further comprises a third set of foam ink nodes located on the inner-facing surface of the inner article.

14. The upper-body apparel system of claim 13, wherein a portion of the third set of foam ink nodes comprise a perforation extending through the respective foam ink nodes and the inner article to form a fluid communication path from the inner-facing surface of the inner article to the outer-facing surface of the inner article.

15. The upper-body apparel system of claim 13, wherein the third set of foam ink nodes are located on side portions of the inner article.

16. An apparel system comprising:

an inner article having an inner-facing surface and an outer-facing surface, the inner article comprising a first set of foam ink nodes located on the inner-facing surface of the inner article, the inner article further comprising a second set of foam ink nodes located on the outer-facing surface of the inner article wherein one or more of the first set of foam ink nodes and the second set of foam ink nodes comprise a perforation extending through the respective foam ink nodes and the inner article to form a fluid communication path from the inner-facing surface of the inner article and the outer-facing surface of the inner article; and an outer article configured to be worn over the inner article, the outer article having an inner-facing surface and an outer-facing surface, the outer article comprising a third set of foam ink nodes located on the inner-facing surface of the outer article.

17. The apparel system of claim 16, wherein a portion of the third set of foam ink nodes comprise a perforation extending through the respective foam ink nodes and the outer article to form a fluid communication path from the inner-facing surface of the outer article and the outer-facing surface of the outer article.

* * * * *

UNITED STATES PATENT AND TRADEMARK OFFICE
CERTIFICATE OF CORRECTION

PATENT NO. : 10,765,158 B2  
APPLICATION NO. : 16/286177  
DATED : September 8, 2020  
INVENTOR(S) : Yuki Aihara et al.

Page 1 of 1

It is certified that error appears in the above-identified patent and that said Letters Patent is hereby corrected as shown below:

In the Claims

Column 18, Line 15: In Claim 16, after "article" insert -- , --.

Signed and Sealed this  
Third Day of November, 2020

Andrei Iancu  
*Director of the United States Patent and Trademark Office*